July 19, 1932.  D. E. WILLIAMS  1,867,691
AUTOMATIC WATERING VALVE
Filed Jan. 28, 1926
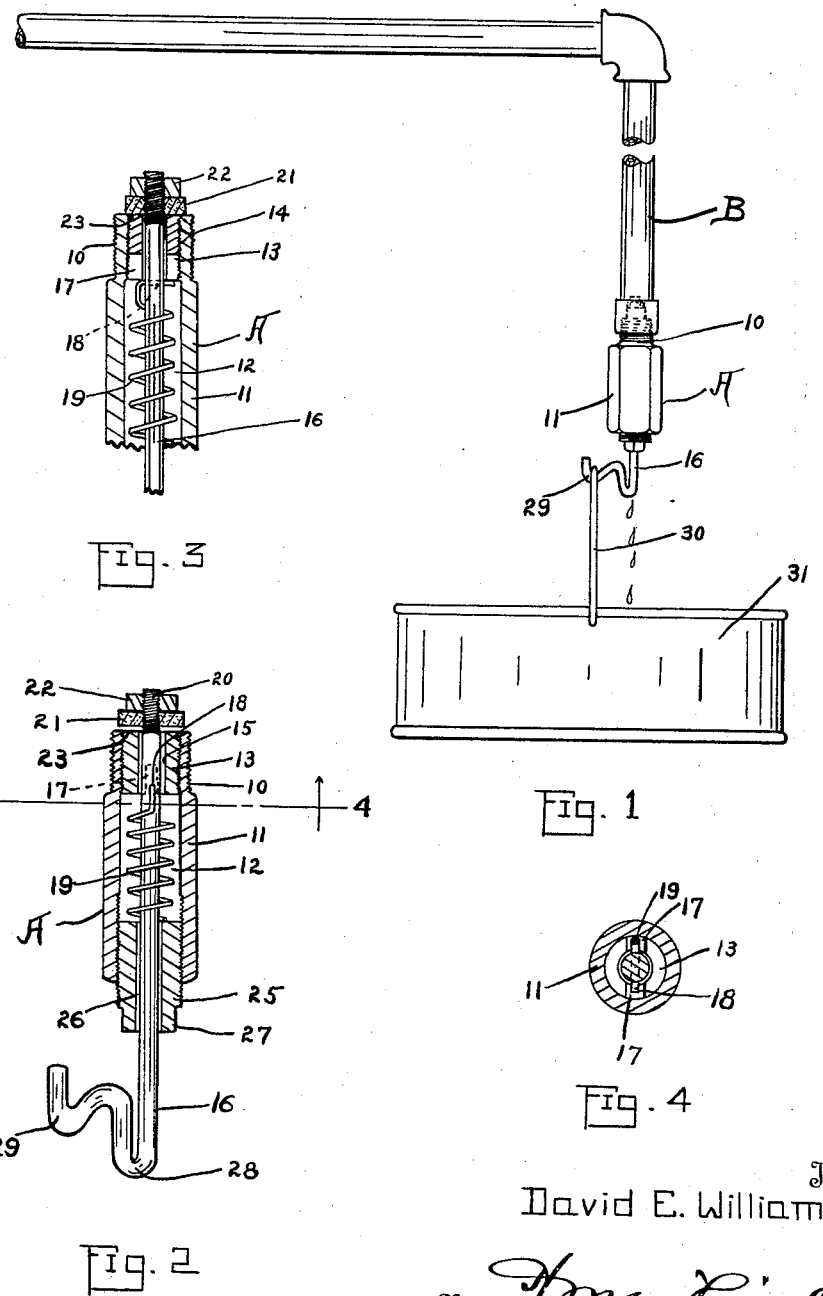
Inventor
David E. Williams
By [signature] Attorney Patented July 19, 1932

1,867,691

UNITED STATES PATENT OFFICE

DAVID E. WILLIAMS, OF ST. PAUL, MINNESOTA

AUTOMATIC WATERING VALVE

Application filed January 28, 1926. Serial No. 84,426.

My invention relates to automatic watering valves wherein it is desired to provide a valve which may be used on a water supply and which operates automatically to keep a certain amount of water in a receptacle. Such a valve is very desirable for watering chickens or for a cattle watering trough.

A feature of the invention resides in means designed to provide an extremely simple automatic valve which is operable by the pressure of the water in a receptacle to be shut off automatically.

It is also a feature of my invention to provide a valve which may be locked into closed position when it is desired.

The invention includes an automatic valve for controlling the flow of liquid through the same by the pressure or weight of the liquid which is passed through the valve and held by the same in suspension.

My automatic valve is adjustable as to tension so as to permit more or less liquid to operate the same as may be desired. This permits the valve to be adjusted so that a receptacle can be supported by the valve to hold a larger or less amount of liquid before the valve operates to shut off. The amount of the liquid regulates the shutting off of the valve. My valve also includes a particular formation which causes the drip at the near closing point of the valve to be carried along the valve stem and discharged without having a tendency to follow the bail or handle of the receptacle for the liquid. This is an important feature of the invention as in the construction of my valve the simplicity requires a certain design and should the drip of the liquid at the near closing point of the valve follow the valve stem, which supports the liquid receptacle, unless the valve stem is properly designed the drip or slow flow of the liquid through the valve would follow the handle or bail and be drained off on to the ground instead of into the receptacle.

These features including other details and objects of the invention will be more fully and clearly set forth.

In the drawing forming part of my specification:

Figure 1 is a side view illustrating the operation and use of my valve.

Figure 2 is a cross sectional view of the valve.

Figure 3 illustrates a cross section of a portion of the valve showing the same in locked position.

Figure 4 is a section on the line 4—4 of Figure 2.

In the drawing my automatic valve A is adapted to be attached to a liquid supply B by attaching the same at the threaded end 10 to the liquid supply pipe B.

I have designed my valve of a very simple nature having in mind a desire to provide a valve which is effective to open and close automatically by the weight of the liquid which passes through the same.

The body portion 11 of my valve A may be of any suitable design and shape and for convenience I have illustrated the same in the drawing hexagonal so that the valve may be engaged readily to attach the screw end 10 to the liquid supply B. This construction permits the valve A to be threaded into engagement with any suitable threaded opening and thus simplifies the attachment.

The body portion 11 of my valve A is hollow having an internal chamber 12. Within the upper end of the chamber 12 I provide a sleeve core 13 which is threaded or otherwise secured at 14 to the body 11. The sleeve 13 is provided with an axial opening 15 through which the valve rod 16 is adapted to extend. The sleeve 13 is formed with recesses 17 which are adapted to receive the horizontal end 18 of the coil spring 19 which is adapted to be positioned in the chamber 12 about the valve stem 16 when the valve stem is in operative position to permit liquid to flow through the valve.

The valve stem 16 is threaded on one end at 20 and is adapted to receive the valve 21 which is held in place by the nut 22 engaging the thread 20 on the rod 16. The valve 21 is formed of rubber or other suitable material and may be replaced very readily after the same becomes worn out. The valve 21 is adapted to seat against the upper surface 23 of the sleeve 13 as illustrated in Figure 3 to close the passageway 15 and thus shut off the flow of liquid through the valve A.

The lower end of the valve stem 16 is adapted to pass through the spring adjusting sleeve 25 which is provided with an axial opening 26 and a nut end 27 so that the sleeve may be readily engaged to operate the same. The sleeve 25 is threaded into the lower end of the chamber 12 and may be adjusted so as to bear against the lower end of the spring 19 to adjust the tension of the spring by the position of the sleeve in the chamber 12. The adjusting of the sleeve 25 regulates the operating of the valve A so that the valve stem 16 may support a more or less amount of liquid.

The lower end of the valve stem 16 is provided with a drip end 28 from which projects the hook 29 which is preferably positioned above the lower end 28 so that in supporting the handle or bail 30 of a receptacle 31, which is adapted to receive the liquid from the valve A, the drip of the liquid or the slow running of the same through the valve as the valve 21 nears the seat 23 and tends to shut off the opening through the valve, the slow flow of liquid will be directed into the receptacle 31 rather than follow along the supporting hook 29 and along the handle 30. It is clearly evident that if this were true the liquid would follow the handle 30 and drip or run out the side of the receptacle 31, thus preventing the shutting off of the valve A. I have therefore so designed my valve stem as to cause the drip or slow flow of the liquid through the valve to enter the receptacle. Thus, when the liquid in the receptacle 31 becomes sufficient to counteract the spring 19, the valve 21 shuts off the flow of liquid through the passageway 15, chamber 12 and out through the passageway 26.

When it is desired my valve A can be readily locked in closed position drawing down on the hook 29 sufficiently to close the valve 21 tight against the seat 23 and then turning the valve stem 16 sufficiently to turn the end 18 of the spring 19 at right angles to the recesses 17 so as to abut the lower end of the sleeve 13, thus holding the valve 21 in locked closed position. The end 18 of the spring 19 is adapted to extend through the valve stem 16. This holds the end 18 rigidly in place in a manner so that it will operate with the valve stem when the same is rotated. This feature of my invention provides a double function to my valve as it permits the valve to be shut off when it is desired and locked in closed position, or by turning the valve stem 16 sufficiently to release the valve, the spring automatically forces the valve open and the weight of the liquid supported by the hook 29 regulates the flow of the liquid through the valve.

My invention is particularly designed to operate as a chicken watering valve so that a receptacle such as 31 can be placed upon the supporting hook 29 and the valve A attached to the water supply B. When so attached, the valve A is adapted to operate automatically to keep the receptacle 31 full of water. As soon as the receptacle is full the valve is automatically closed by the weight of water in the receptacle and as the water is used out of the receptacle 31 or evaporates, the valve A automatically opens to fill it again. The simple inexpensive construction of my valve makes it practical to use the same for watering chickens.

I do not wish to confine the use of my valve to the watering of chickens or other fowl alone, but I desire to have it understood that it is a practical means of watering stock in automatically keeping a certain supply of water in a receptacle supported by the valve. It is also evident that my automatic valve may be used for purposes where it is desired to provide an automatic shut off valve by the weight of the liquid and the valve structure may be of any suitable design. I have illustrated a particular formation and construction in my drawing but I desire to have it understood that these are only suggestive and that the invention can be carried out by other means and applied to uses other than those above set forth within the scope of the following claims:

I claim:

1. An automatic liquid shut-off valve including, a body portion, a valve stem extending through said body portion, a valve on one end of said stem cooperating with said body portion, and a supporting hook on the other end, and resilient means interposed between the valve and the hook in a manner to cause the valve to open when the liquid supported by the valve stem is decreased sufficiently to permit the resilient means to open the valve.

2. A chicken watering valve including, a body portion adapted to support a valve cooperating with said body portion in a manner to permit the water to run through the valve when the same is open, a valve stem extending throughout said body portion, resilient means for opening the valve, and a hook formed on the lower end of said valve stem adapted to support a watering receptacle so that the weight of the water within the same will close the valve automatically.

3. An automatic watering valve including a body portion, a valve element cooperating with said body portion, a valve stem, resilient means within said body portion for holding the valve in open position, and integral means formed on the lower end of said stem to support a receptacle to receive water whereby when the receptacle is filled to the desired amount with water the valve will automatically close.

4. A valve having, means for directly supporting liquid, means for automatically opening the valve, means for automatically closing the valve by the weight of the liquid supported, and means within said valve for locking the valve in closed position without disturbing the adjustment of said valve.

5. An automatic valve including, valve means, means for opening the valve, means for supporting liquid directly by the valve, means for adjusting the valve opening means, and means for locking the valve in closed position by changing the position of the valve opening means.

6. An automatic valve including a body portion, a valve stem passing through said body portion, valve means upon one end of said stem and the other end of said stem being bent to form supporting means for a trough spaced from the axis of said stem whereby water passing through said body portion will drip from the lower end of the valve stem in alinement with the valve stem.

7. A valve having a body portion, a valve stem extending through said body portion, the lower end of said valve stem being bent in substantially an S-shape so as to provide a supporting hook spaced from the axis of the valve stem.

DAVID E. WILLIAMS.